UNITED STATES PATENT OFFICE.

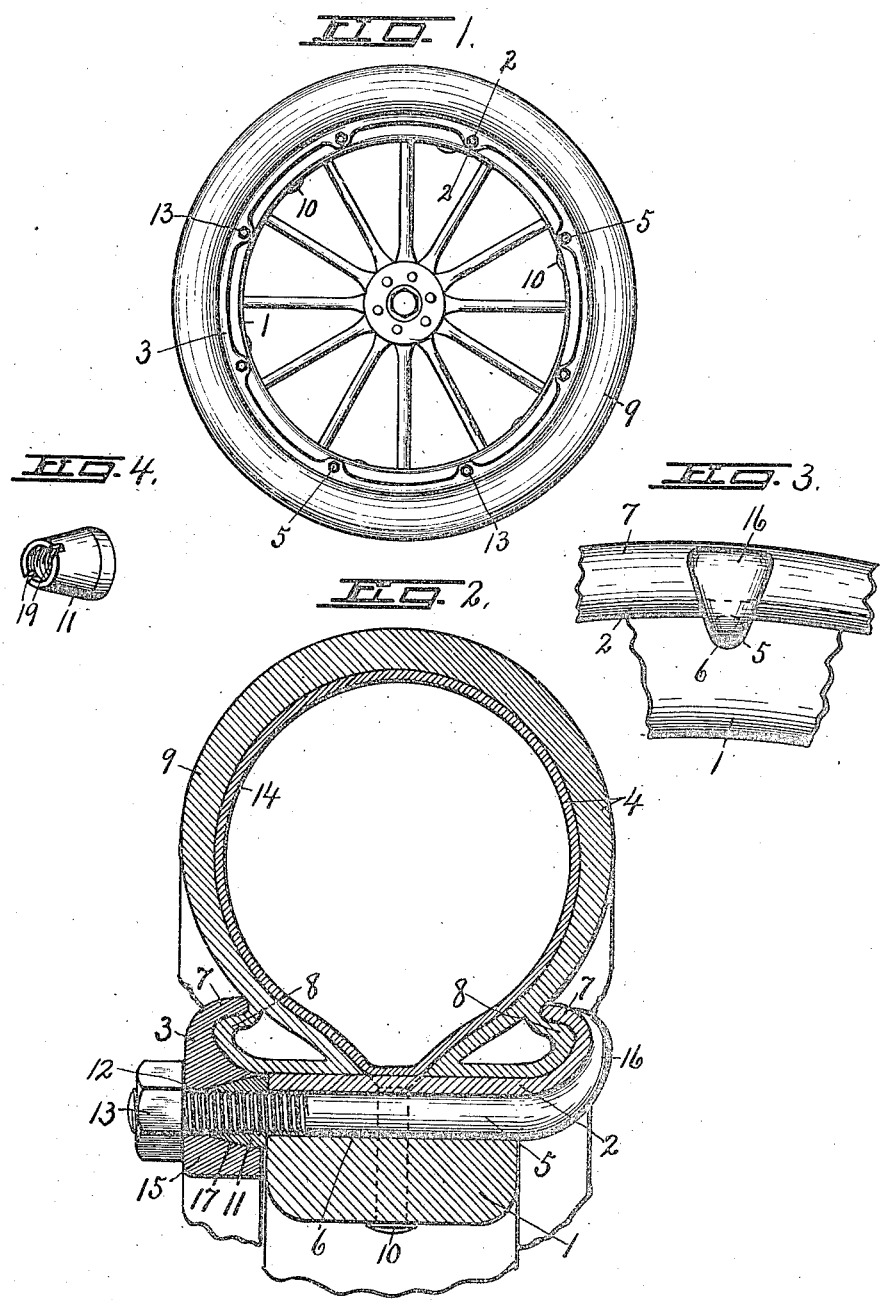

LAWSON U. HURLBURT, OF SYRACUSE, NEW YORK.

VEHICLE-WHEEL.

1,247,684.

Specification of Letters Patent.  Patented Nov. 27, 1917.

Application filed December 6, 1915.  Serial No. 65,273.

*To all whom it may concern:*

Be it known that I, LAWSON U. HURLBURT, a citizen of the United States of America, and resident of Syracuse, in the county of Onondaga, in the State of New York, have invented new and useful Improvements in Vehicle-Wheels, of which the following, taken in connection with the accompanying drawings, is a full, clear, and exact description.

This invention relates to certain improvements in vehicle wheels and refers more particularly to sectional clencher rims for pneumatic tires and to the means for clamping one of the rim sections to the other, whereby the pneumatic tire may be easily and quickly removed and replaced, as distinguished from the one-piece clencher rim in which it is necessary to pry the base flanges of the shoe or casing inwardly and outwardly beyond the flanges of the rim in placing the tire upon or removing it from such rim.

Various devices have been proposed for carrying out this main object, but in all such devices so far as I am aware both rim sections rest upon the periphery of the felly or else one section is secured to the felly and the other section rests upon the adjacent base flange of the tire or upon the adjacent portion of the first-named rim section, and in other cases the bolts for clamping the rim sections together are passed transversely through openings in said sections, thus necessitating an excessively heavy rim, or the cutting away of portions of the felly to such an extent as to weaken the same.

The main object of my present invention is to permanently secure one of the rim sections, which may be termed the main section, directly to the periphery of the felly and to clamp the removable section thereto independently of the tire or felly by transverse bolts underlying and in direct contact with the under side of the main section and engaging the clencher flanges of both sections so as to apply the clamping force as nearly as possible in direct lines between the base flanges of the tire.

In other words, I have sought to construct and arrange the clamping bolts so as to engage the extreme outer faces or edges of the rim sections at points as closely as possible to the base of the tire without in any way weakening the main rim section by apertures therethrough or excessively weakening the felly.

Another object is to arrange the bolts so that the clamping nuts will engage the outer face of the removable section, whereby such section may be removed and replaced by simply removing and replacing the nut without displacing the bolts.

A further object is to provide simple means coöperating with the bolt and removable section for holding said section in definitely spaced relation relatively to the flange of the main section.

Other objects and uses will be brought out in the following description.

In the drawings—

Figure 1 is an end view of a vehicle wheel embodying the features of my invention.

Fig. 2 is an enlarged transverse sectional view through the felly rim and tire, taken on line 2—2, Fig. 1.

Fig. 3 is a side elevation of a portion of the rim and felly and one of the clamping bolts for the rim sections.

Fig. 4 is a perspective view of one of the detached stop collars for the removable rim section.

As illustrated, this wheel comprises a felly —1—, rim sections —2— and —3—, a pneumatic tire —4— and clamping bolts —5— connecting the rim sections —2— and —3—.

The felly —1— is preferably made of wood in standard forms and sizes, the periphery thereof being substantially flat transversely, said felly being provided in its periphery with a series of transverse bolt openings —6— for receiving the bolts —5— and allowing said bolts to rest directly against the under side of the rim section —2— metal-to-metal to better resist strains upon the bolt and bear upon the felly.

This rim section —2—, which may be termed the main section, is preferably made of rolled steel or other suitable material and of sufficient width to extend from the side of the felly adjacent the removable section —3— entirely across the periphery and some distance beyond the opposite side of the felly, and has its outer edge overturned to form a clencher flange —7— for receiving and retaining the adjacent base flange —8— of the tire shoe or casing —9—, said main rim section being of substantially uniform thickness from edge to edge, while its base portion is substantially flat transversely and is tightly fitted upon the periphery of the felly to which it is permanently secured by rivets —10— passing radially through the rim section —2— and felly, as shown by dotted lines in Fig. 2.

The edge of the rim section —2— adjacent the removable rim section —3— is substantially coincident with the corresponding edge of the felly to form a metal bearing for the adjacent face of the rim section —3— or bolt-retaining collars —11—, when the latter are employed for a purpose hereinafter described.

The rim section —3— may also be made of rolled steel or other suitable metal and is relatively narrow transversely as compared with the width of the section —2—, or of about the same width as that portion of the section —2— which extends beyond the felly so as to lie wholly outside of the adjacent face of said felly in which position it is supported entirely by the adjacent ends of the bolts —5—, the threaded ends of which are passed through apertures —12— engaged by nuts —13—.

The section —3— is also provided with an overturned flange —7— similar to the one on the section —2— for receiving and retaining the adjacent flange —8— on the base of the tire shoe —9— which is divided circumferentially through its inner side in the usual manner and is adapted to be distended or inflated by air through the medium of an ordinary inner tube —14—.

The base of the tire —4—, therefore, rests directly upon the periphery of the rim section —2— and is held in place against radial or lateral movement by the flanges —7— of the rim sections —2— and —3—, the rim section —3— being provided at regular intervals throughout its length with inwardly projecting lugs —15— extending some distance inwardly beyond the inner face of the rim section —2— and part way across the adjacent face of the felly, and as previously stated, are provided with bolt openings —12— for receiving the bolts —5—, the remaining portions of said rim section being of substantially the same size and form in cross section as that portion of the rim section —2— which extends beyond the opposite side of the felly.

The bolts —5—, which correspond in number to the number of lugs —15— and are arranged in the same spaced relation circumferentially, extend transversely across and directly under and some distance beyond the opposite edges of the main rim section —2—, each bolt being provided at one end with an out-turned hook-shaped head —16— gradually increasing in width circumferentially toward its terminus and conforming to the curvature of the outer face of the adjacent flange —7— against which it is adapted to closely fit when the bolt is tightened, the opposite end of said bolt being threaded and extended through the aperture —12— for receiving the nut —13— which engages the outer face of the rim section —3— so that when the nut is tightened, the two rim sections are drawn toward each other for firmly locking the flanges —7— upon the tire flanges —8—, and thereby holding the tire on the rim.

The bolt openings —12— in the rim section —3— are gradually enlarged toward their inner ends to form tapering sockets —17— in which are seated a corresponding number of cone-shaped nuts —11— which are screwed upon the threaded portions of the bolts —5— and may be adjusted tightly against the adjacent edge of the rim section —2— to retain the bolts in operative position against endwise movement when the rim sections —3— are being removed and replaced, it being understood that the cone nuts —11— are adjusted before the rim section —3— is placed in operative position.

Another function of the cone nuts is to assist in centering the rim section —3— upon the bolts and also to form tight fitting bearings for the removable rim section to relieve the bolt from excessive strains, and furthermore to prevent battering of the threads of the bolts by the removable rim section.

These cone nuts also serve as limiting stops for the rim section —3— to enable the base flanges to be placed in operative position relatively to the flanges —7— of the rim section —2—.

In the first assembling of the rim and tire upon the felly after the rim section —2— is secured to the tire by the rivets —10— the bolts —5— are then passed through the openings —6— in the felly with their hook-shaped ends —16— in engagement with the flanges —7— of the rim section —2—, whereupon the cone collars or nuts —11— are screwed upon the threaded ends of the bolts tightly against the adjacent edge of the section —2—, said nut being provided in its outer end with slots —19— for receiving a suitable spanning wrench, not shown, but by which the nut may be tightened and loosened.

After the bolts are thus secured in place, the tire is placed upon the rim until one of its base flanges —8— is interlocked with the corresponding flange —7— of the section —2—, whereupon the rim section —3— is placed in operative position upon the cone nuts —11— and secured in place by the nuts —13— with the assurance that the flanges —7— will be spaced the desired distance apart for engaging the tire flanges —8— and holding the tire in operative position.

In removing the tire, it is simply necessary to remove the nuts —13— and then to withdraw the rim section —3—, whereupon the partially deflated tire may be easily and quickly withdrawn from the periphery of the rim section —2— without in any way disturbing the bolts —5—, it being understood that the same tire or another one may be placed upon the rim while the section —3— is removed and the section —3— then replaced and locked in operative position by the nuts —13—.

What I claim is:

1. In a vehicle wheel, the combination of a felly having bolt openings therethrough, a clencher rim section secured to the periphery of the felly, bolts in said openings engaging at one end the outer edge of said rim section and having their opposite ends threaded, internally threaded tapered sleeves engaging the threaded ends of the bolts for holding said bolts in engagement with said rim section, a separate clencher rim section mounted on said sleeves, nuts engaging the threaded ends of the bolts for holding the last-named rim section on the sleeves, and a tire held in place by said rim sections.

2. In a vehicle wheel, the combination of a felly having transverse bolt openings in its periphery, a clencher rim section secured to the periphery of the felly, bolts in said openings engaging the inner face and one edge of said rim section and threaded at the opposite edge of said rim, internally threaded sleeves engaging the threaded ends of the bolts and adjacent edges of the rim section to hold the bolts against endwise displacement, a separate clencher rim section mounted on said sleeves, nuts engaging the threaded ends of the bolts and the last-named rim section, and a tire held in place by said rim sections.

3. In a vehicle wheel, the combination of a felly having transverse bolt openings in its periphery, a clencher rim section secured to the periphery of the felly, bolts in said openings engaging the inner face and one edge of said rim section and threaded at the opposite edge of said rim, internally threaded sleeves engaging the threaded ends of the bolts and adjacent edge of the rim section to hold the bolts against endwise displacement, a separate clencher rim section mounted on said sleeves, nuts engaging the threaded ends of the bolts and the last-named rim section, and a tire held in place by said rim sections, said sleeves being tapered and engaged in tapered sockets in the inner faces of the separate rim-section to support said section apart from the felly.

In witness whereof I have hereunto set my hand this 29th day of November, 1915.

LAWSON U. HURLBURT.

Witnesses:
H. E. CHASE,
ALICE M. CANNON.